United States Patent
Dougherty et al.

(10) Patent No.: US 6,299,360 B1
(45) Date of Patent: Oct. 9, 2001

(54) HUB ASSEMBLY HAVING A CAPTURED RING AND PROCESS FOR ASSEMBLING THE SAME

(75) Inventors: John d. Dougherty, Canton, OH (US); Peter Holland, Nottingham (GB)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/383,180

(22) Filed: Aug. 25, 1999

(51) Int. Cl.$^7$ ........................................................ F16C 19/38
(52) U.S. Cl. ........................... 384/584; 384/537; 384/544; 384/589
(58) Field of Search ..................................... 384/544, 589, 384/537, 585, 543

(56) References Cited

U.S. PATENT DOCUMENTS

| | | |
|---|---|---|
| 4,893,960 | 1/1990 | Beier et al. . |
| 5,226,738 | 7/1993 | Valette et al. . |
| 5,490,732 | 2/1996 | Hofmann et al. . |
| 5,740,895 | 4/1998 | Bigley . |
| 5,782,465 | 7/1998 | Bertetti et al. . |
| 5,782,565 | 7/1998 | Bertetti et al. . |
| 5,853,250 | 12/1998 | Krude et al. . |
| 5,984,422 | 11/1999 | Seifert . |
| 6,112,411 | 9/2000 | Rutter . |
| 6,146,022 | 11/2000 | Sahashi et al. . |

FOREIGN PATENT DOCUMENTS

| | | |
|---|---|---|
| 9825772 | 6/1998 | (AU) . |
| 197 51 855 | 4/1999 | (DE) . |
| 0736398 | 10/1996 | (EP) . |
| 9858762 | 12/1998 | (WO) . |
| WO9858762 | 12/1998 | (WO) . |

Primary Examiner—Lenard A. Footland
(74) Attorney, Agent, or Firm—Polster, Lieder, Woodruff & Lucchesi, L.C.

(57) ABSTRACT

A hub assembly includes a hub having a spindle with a flange and a shoulder at one end of the spindle and a formed end turned outwardly at the other end of the spindle. In addition, the hub assembly includes a bearing having two cones set end to end and an outer race in the form of a housing located around the cones, and tapered rollers arranged in two rows between the outer race and cones. Initially the formed end of the spindle exists as an axially directed end portion of the spindle. The bearing is installed over this end portion and moved further along the spindle to bring the back face of one of its cones against the shoulder on the flange. The back face of the other cone lies at the end of a spline that leads out to the end portion on the spindle. A coupler ring having exterior and interior splines is installed over the spindle end porotion with its interior spline engaged with the spindle spline. Thereupon a circular clip is installed over the skpindle end portion and brought against the end of the interior spline on the coupler ring. The clip has circular cross-section, and this presents a contoured surface of generous radius beyond the interior spline. Finally, by rotary forming the spindle end portion is deformed over the contoured surface of the clip and against the end face of the coupler ring to create the formed end, so that the coupler ring and cone of the bearing lie captured between the formed end and the shoulder. Torque is transferred to the hub through the coupler ring when the ring is engaged with a drive train.

25 Claims, 2 Drawing Sheets

HUB ASSEMBLY HAVING A CAPTURED RING AND PROCESS FOR ASSEMBLING THE SAME

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

This invention relates in general to capturing a ring-like component or a spindle and more particularly to a hub assembly having a captured ring and a process for assembling the same.

Most light automotive vehicles that are equipped with four wheel drive travel for the most part on paved roads where traction is good. Under these circumstances this type of vehicle operates more efficiently and with less tire wear with only two wheels driving. Hence, the typical four wheel drive vehicle has a mechanism, such as a transfer case, for engaging and disengaging two of the wheels. In sport-utility vehicles and pick-up trucks equipped with four wheel drive, the rear wheels serve as the primary driving wheels and the mechanism engages and disengages the front wheels. But other vehicles, such as some automobiles and vans, rely on the front wheels as the primary driving wheels.

In any event, the drive train for the primary wheels remains permanently coupled to the transmission for the vehicle. Even though the drive train for the remaining wheels may be disengaged from the transmission when the vehicle negotiates clear pavement, the wheels will power that drive train causing its components to rotate unless the drive train is further equipped with a disconnect mechanism at those remaining wheels. The disconnect mechanism may take the form of a splined coupler ring which slides over a drive spline on a constant velocity (CV) joint, and in so doing moves between a disengaged position where it lies entirely around a spline on the CV joint and an engaged position where it lies not only around the spline on the CV joint, but also around a spline that forms part of a wheel hub, thus coupling the CV joint to the hub so that torque is transmitted from the drive train to the hub. U.S. Pat. No. 5,740,895 shows such a mechanism.

BRIEF SUMMARY OF THE INVENTION

The present invention in a broad sense involves the use of a circular clip to facilitate the capture of a ring-like component on a spindle when the end of the spindle is deformed outwardly. In a narrower sense the invention resides in a hub assembly that includes a hub having a spindle, a shoulder at one end of the spindle, and a formed end at the other end, with the formed end being produced by deforming radially outwardly an initial axially directed end on the spindle. The inner race of a bearing and a ring lie captured between the shoulder and the formed end, with the formed end being turned up against the ring. The ring may be coupled to the spindle at a spline and may have an exterior spline capable of being engaged by a connect-disconnect mechanism. The axially directed portion of the spindle is turned outwardly over a circular clip which provides a generous radius at which the deformation occurs. The circular clip also prevents the edges at the ends of the splines on the spindle and ring from contacting the formed end and initiating fatigue cracks or fretting damage. The invention also consists in the parts and in the arrangements and combinations of parts hereinafter described and claimed.

BRIEF DESCRIPTION OF THE SEVERAL VIEWS OF THE DRAWINGS

In the accompanying drawings which form part of the specification and wherein like numerals and letters refer to like parts wherever they occur.

Corresponding reference numerals will be used throughout the several figures of the drawings.

DETAILED DESCRIPTION OF THE INVENTION

Figure 1:
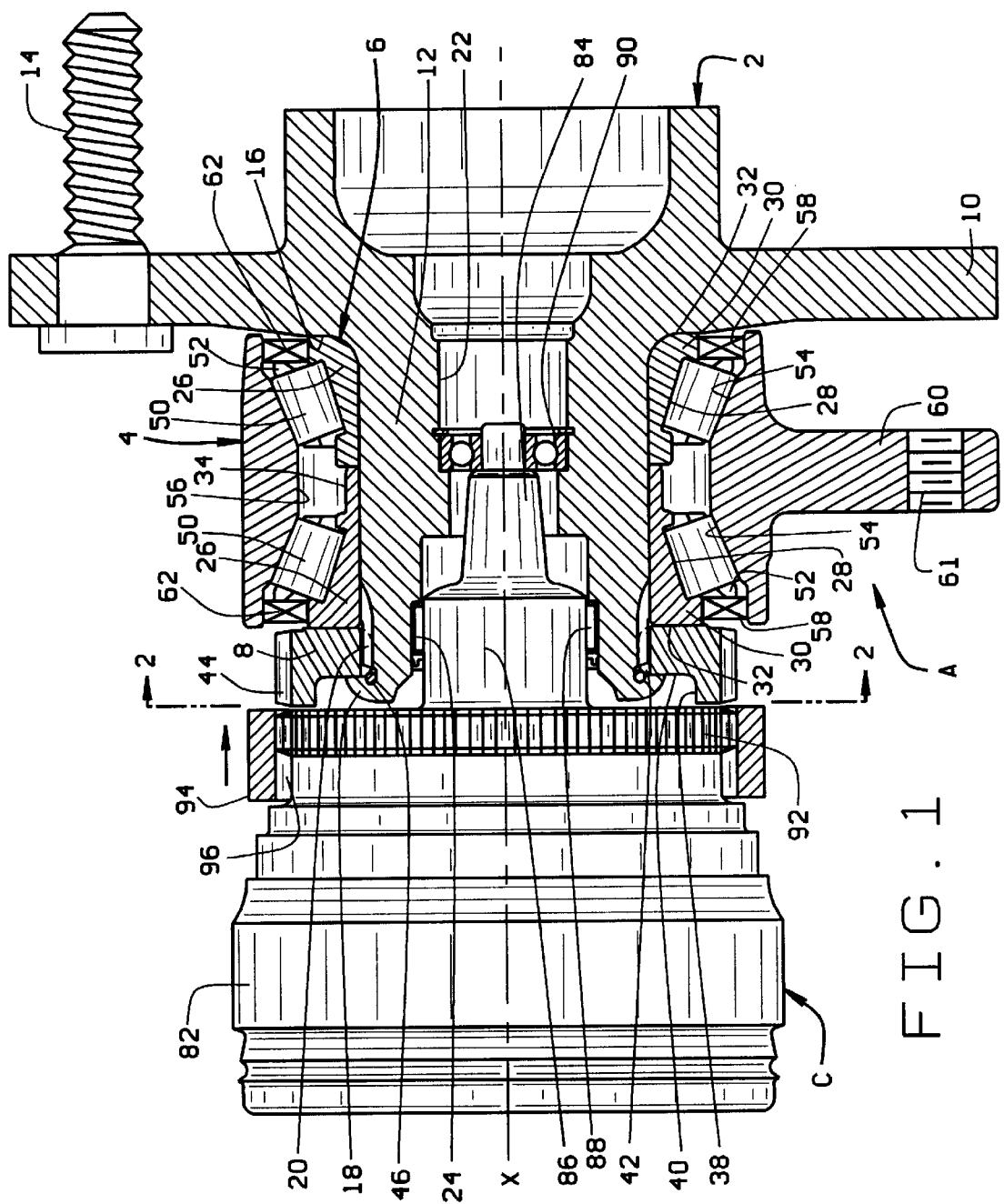
FIG. 1 is a sectional view of a hub assembly constructed in accordance with and embodying the present invention and also showing a CV joint that optionally drives the hub of the hub assembly.

Referring now to the drawings, a hub assembly A (FIG. 1), which mounts a road wheel for a vehicle on the suspension system of the vehicle, includes a hub 2, a housing 4, a bearing 6 which enables the hub 2 to rotate relative to the housing 4 about an axis X of rotation with relatively little friction, and a coupler ring 8 which is engaged with to the hub 2 for transferring torque to the hub 2. A road wheel and a brake disk (not shown) are attached to the hub 2, while the housing 4 is secured firmly against a component of the vehicle suspension system, such as a steering knuckle (not shown). Here the hub 2 aligns with a rotatable component, such as a CV joint C located at the end of a drive train.

The hub 2 (FIG. 1) has a flange 10 and a spindle 12 which projects from one face of the flange 10. Radially beyond the spindle 12 the flange 10 contains lug bolts 14 which project axially from its other face. Lug nuts thread over the bolts 14 to fasten a brake rotor and road wheel to the hub 2. The spindle 12 emerges from a shoulder 16 located along the inside face of the flange 10 and terminates at an outwardly directed formed end 18 located at its opposite end. The spindle 12 along its exterior has a spline 20 which leads up to, but terminates short of, the formed end 18, and further contains a bore 22 and counterbore 24, the latter of which opens out of the formed end 18. The spindle 12, flange 10 and formed end 18 are formed integral.

The bearing 6 includes (FIG. 1) an inner race in the form of two cones 26 which fit around the spindle 12 where they are captured between the shoulder 16 and the formed end 18, there being an interference fit between each cone 26 and the spindle 12. Each cone 26 has a tapered raceway 28 that is presented outwardly away from the axis X, a thrust rib 30 at the large end of its raceway 28, and back face 32, which is squared off with respect to the axis X, on the end of the thrust rib 30. The inboard cone 26 is somewhat longer than the outboard cone 26 by reason of a cylindrical cone extension 34 which projects beyond the small end of its raceway 28. The cone extension 34 may serve as a seat for a target wheel that is monitored by a speed sensor. The inboard cone 26 at its cone extension 34 abuts the small end of the outboard cone 26 along the spindle 12, that is to say, the two cones 26 abut at their front faces. The back face 32 of the outboard cone 26 abuts the shoulder 16 that lies along the flange 10. The formed end 18 turns outwardly beyond the inboard cone 26 and serves to capture the two cones 26 and the coupler ring 8 on the spindle 12, with the coupler ring 8 encircling and engaging the spline 20.

Figure 3:
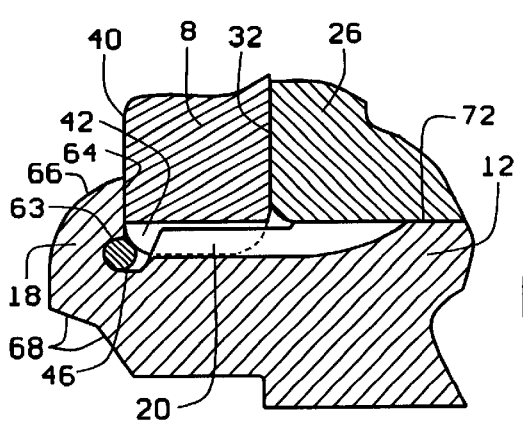
FIG. 3 is a fragmentary and enlarged sectional view of the formed end produced by deforming the end of the hub spindle and the circular clip over which the deformation occurs.
Figure 4:
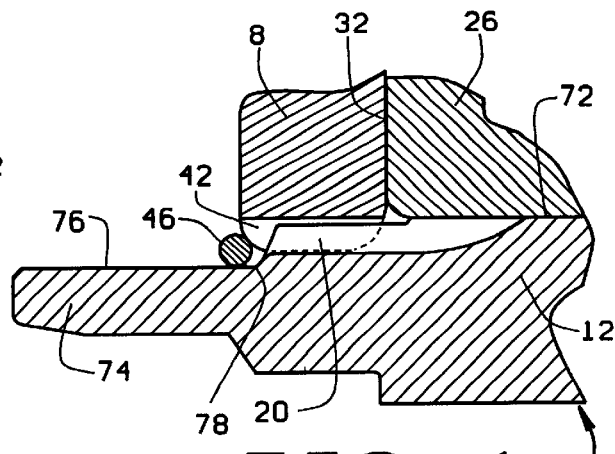
FIG. 4 is a fragmentary and enlarged sectional view of the spindle and circular clip before deformation of the spindle end.

The coupler ring 8 lies between the back face 32 of the inboard cone 26 and the formed end 18 (FIGS. 1, 3 and 4). Indeed, the ring 8 contains an undercut 38 where it has a flat end face 40 that lies perpendicular to the axis X. The formed end 18 turns into the undercut 38, so that the ring 8 not only lies in front of the formed end 18, but also extends over the formed end 18. Alternatively, the coupler ring 8 may be furnished without the undercut 38. In either arrangement the ring 8 has an interior spline 42 which engages the spline 20 on the spindle 12, so that the ring 8 is positively connected to the spindle 12 and cannot slip on, that is to say, rotate relative to, the spindle 12. The ring 8 also has an exterior spline 44 which lies radially beyond the thrust rib 30 for the inboard cone 26.

At the inside corner at the end of the spindle 12, that is at the corner created by the formed end 18, an annular element in the form of a clip 46 of circular cross-section encircles the spindle 12 (FIGS. 1, 3 and 4). The clip 46, which is formed from steel, lies beyond the end of the spline 20 on the spindle 12 and bears against the end of the interior spline 42 for the coupler ring 8. It is not continuous, but instead contains a break to accommodate expansion. When the clip 46 is not deformed, the inside diameter of the clip 46 is less than the diameter of the region of the spindle 12 which the clip 46 encircles. The clip 46 provides a radius of at least 0.020 in. and preferably about 0.080 in. about which the end 18 is formed.

In addition to the cones 26, the bearing 6 includes (FIG. 1) tapered rollers 50, arranged in two rows, there being a separate row around each cone 26. Actually, the rollers 50 extend around the raceways 28 for the cones 26, with their tapered side faces being along the raceways 28 and their large end face against the thrust ribs 30. The rollers 50 of each row are essentially on apex, which means that the envelopes in which their tapered side faces lie have their apices located at a common point along the axis X. Each row of rollers 50 has a cage 52 to maintain the proper spacing between the rollers 50 in that row.

The ring-like housing 4 surrounds the spindle 12 as well as the two cones 26 and the two rows of rollers 50 (FIG. 1). It forms part of the bearing 6 in that it has tapered raceways 54 which are presented inwardly toward the axis X. Indeed, the housing 4 constitutes the outer race of the bearing 6. The raceways 54 on the housing 4 taper downwardly toward an intervening surface 56 which separates them. The rollers 50 likewise lie along the raceways 54 of the housing 4, contacting the raceways 54 at their tapered side faces. At their large ends, the raceways 54 open into short end bores 58 in which the thrust ribs 30 of the two cones 26 are located.

Figure 2:
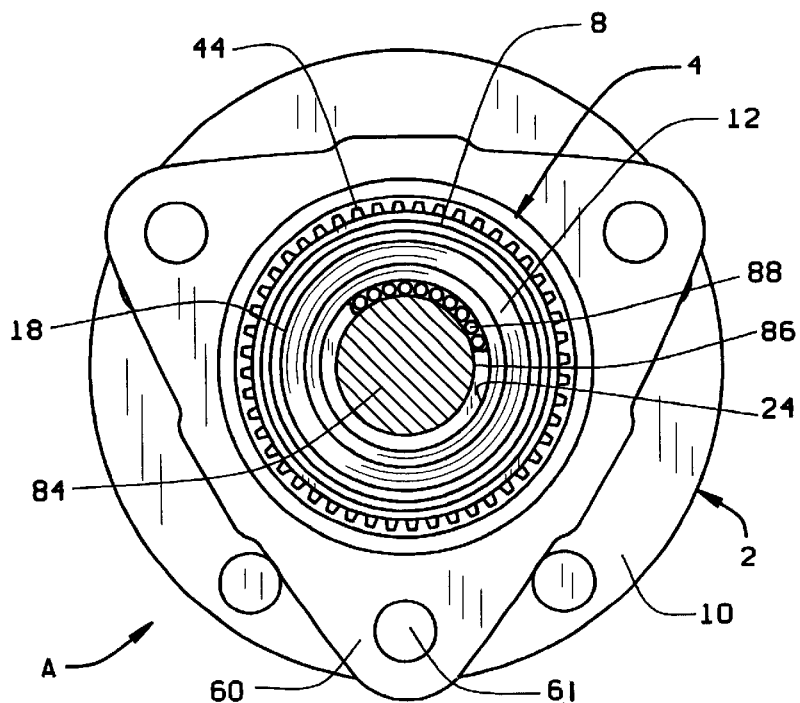
FIG. 2 is an end view of the hub assembly taken along line 2—2 of FIG. 1.

Generally midway between its ends, the housing 4 has a triangular or rectangular flange 60 (FIG. 2) which fits against a component of a suspension system for a vehicle. Here the housing A is secured firmly to the suspension system component with bolts that engage threaded holes 61 located in the lobes of the flange 60.

The end bores 58 in the housing 4 contain seals 62 which fit around the thrust ribs 30 on the cones 26 to establish dynamic fluid barriers at the ends of the housing 4. These barriers isolate the rollers 50 and the raceways 28 and 54 from road contaminants, such as water, ice-melting salts and dirt. U.S. Pat. No. 5,022,659 discloses a suitable seal.

The formed end 18 lies behind the coupler ring 8 so that the ring 8 along with the two cones 26 are captured between shoulder 16 and the formed end 18, with the small ends of the cones 26 being in abutment. This not only retains the ring 8 and cones 26 on the spindle 14, but also retains the housing 4 and rollers 50 in place, this being attributable to the tapered geometry. In short, the formed end 18 unitizes the hub assembly A.

More specifically, the formed end 18 wraps around the coupler ring 8 at the circular clip 46 which imparts a profiled or curved inside corner 63 to the end 18 (FIG. 3), and immediately outwardly from the clip 46 the end 18 has a flat inside end face 64 that lies along the flat end face 40 of the coupler ring 36. On its opposite side, the formed end 18 has a curved outside end surface 66 which merges into the outer of two beveled surface 68 which lie at an oblique angles with respect to the axis X. The inner beveled surface 68 leads into the counterbore 24. The configurations of the surfaces 66 and 68 may vary, in that those configurations are determined by the shape of a forming tool which produces the formed end 18.

The hub 2 does not always have the formed end 18. Initially, it exists as a pre-form 70 (FIG. 4), which is the condition in which it is forged and then machined. In the pre-form 70 the spindle 12 extends from the shoulder 16 up to the spline 20 as a cylindrical surface 72, while at the spline 20 its diameter is slightly less. Beyond the spline 20, the preform 70 continues, indeed, to its very end, as an axially directed end portion 74 having a cylindrical outside surface 76, the diameter of which is slightly less than the diameter at the roots of the spline 20. The exterior surface 76 merges into the end of the spline 20 at a fillet 78.

The two cones 26 are all installed over the straight spindle 12 of the pre-form 70. So is the coupler ring 8; it locates over the spindle spline 20 with its interior spline 42 engaged with the spindle spline 20, but extended axially slightly beyond the spindle spline 20. This leaves the end portion 74 of the spindle 12 projecting beyond the coupler ring 8 (FIG. 4).

The coupler ring 8 is the last of the foregoing components to be fitted over the spindle 12, and after it is in place, the end of its interior spline 42 lies slightly beyond the end of the spline 20 on the spindle 12 (FIG. 4). Thereupon, the circular clip 46 is installed over the end portion 74 and advanced to the exposed end of the interior spline 42 for the coupler ring 8. In this regard, the circular clip 46 is preferably not continuous, but instead contains a break so that it can be expanded easily. Indeed, it possesses an inside diameter slightly less than the diameter of the outside surface 76 on the end portion 74 of the spindle 12. Thus, the clip 46 expands easily to accommodate the end portion 74, and once it is advanced over the end portion 74, it remains firmly in place against the end of the interior spline 42 for the coupling ring 36. At this time the end portion is deformed radially outwardly and axially backwardly, against the flat end face 40 of the coupling ring 36 to create the formed end 18 (FIG. 3). During the deformation, the metal of the end portion 74 wraps over the clip 46 which imparts a gentle radius to the inside corner 63 where the formed end 18 projects from the spindle 12.

PCT application GB 98/01823, filed Jun. 22, 1998 and published Dec. 30, 1998, under International Publication No. WO 98/58762 discloses a rotary forming process for upsetting the end portion 74 of the preform 70 and converting into the formed end 18 which captures the cones 26 and coupler ring 8 on the spindle 12 and in effect unitizes the bearing 4.

The circular clip 46 provides generous radius over which the metal of the end portion 74 is deformed to produce the formed end 18, and this improves metal flow during the forming operation. This in turn reduces the frequency and size of forming flaws. Also, the generous radius reduces the concentration of stresses where the formed end 18 emerges from the spindle 12, so fatigue cracks are less likely to develop under loading. Moreover, the circular clip 46 isolates the end 18 from the irregular surfaces formed by the ends of the spline 20 on spindle 12 and the interior spline 42 on the coupler ring 8, so that the ends of the splines 20 and 42 cannot induce fretting and the prospect of failure that fretting poses. In addition, the clip 46 enables a thrust load applied to the end 18 to act through a reduced movement arm, and this reduces applied stresses in the end 18. Finally, forming around the circular clip 46 improves surface finish and produces residual compressive stresses in the formed end 18, all to the improvement of the fatigue life of the hub 2 in the region of its end 18.

The hub 2 rotates within the housing 4 as the road wheel, which is bolted to the flange 10 of the hub 2, rolls over a road or other surface. The bearing 6 reduces friction between the spindle 12 of the hub 2, and the housing 4 and further transfers radial and thrust loads between the housing 4 and hub 2. The coupler ring 8 likewise rotates with the hub 2, inasmuch as it is engaged with the spindle 12 of the hub through the mating splines 20 and 42. The other or exterior spline 44 on the coupler ring 8 revolves adjacent to the CV joint C.

The CV joint C forms the end of a drive train which originates at the transmission for the vehicle and includes a drive shaft, a differential as well as an axle shaft (not shown). Indeed, the CV joint C provides a universal coupling between the axle shaft and the hub 2 of the hub assembly A. To this end, the CV joint includes (FIG. 1) a shell 82 which for the most part lies behind the hub 2 and housing 4 of the axle assembly A, but has a spindle 84 which projects through the counterbore 24 and into the bore 22 of the spindle 12 for the hub 2. The spindle 84 for the CV joint C has an enlarged surface 86 which lies within the counterbore 24 of the hub spindle 12, and that surface and the surface of the counterbore 24 serve as raceways for needle rollers 88 which fit between them, thereby providing a needle bearing which enables the shell 82 of the CV joint to rotate relative to the hub 2 of the hub assembly A. The end of the spindle 84 for the CV joint C fits within a ball bearing 90 which is received in the bore 22 of the spindle hub 12, further accommodating rotation of the hub relative to the CV joint C.

The shell 82 of the CV joint C on its outer surface adjacent to the coupler ring 8 on the hub 2 has a spline 92 (FIG. 1) which is configured the same as the exterior spline 44 on the coupler ring 8. Fitted around the spline 92 is a connect-disconnect ring 94 which contains an internal spline 96 that remains continuously engaged with the exterior spline 92 on the shell 82 of the CV joint C. The ring 94 has the capacity to slide axially over the exterior spline 92 of the shell 82 and over the exterior spline 44 of the coupler ring 8, thus engaging the coupler ring 8, so that the shell 82 will transmit torque to the hub 2 and the road wheel attached to the hub 2.

The connect-disconnect ring 94 is actuated by a mechanism which shifts it axially into engagement and out of engagement with the coupler ring 8. U.S. Pat. No. 5,740,895 shows a suitable mechanism. The spline 92 and connect-disconnect ring 94 on the CV joint C and the coupler ring 8 lie within a seal (not shown) which prevents contaminants, such as mud and ice, from clogging the splines 44, 92 and 96 and thereby preventing the connect-disconnect ring 94 from moving.

While the circular clip 46 and the procedure in which it is utilized are well-suited for capturing the splined coupler ring 8 on the hub spindle 12, they are equally well-suited for capturing any type of ring-like component on a spindle when the spindle is deformed outwardly away from its axis to produce a formed end.

This invention is intended to cover all changes and modifications of the example of the invention herein chosen for purposes of the disclosure which do not constitute departures form the spirit and scope of the invention.

What is claimed is:

1. The combination comprising: a spindle having an axis, and a formed end which is directed outwardly away from the axis at a curved inside corner; a ring-like component fitted over the spindle and captured on the spindle by the formed end; and a circular clip fitted around the spindle at the curved inside corner, the formed end having been turned outwardly over the circular clip so that the inside corner matches the contour of the clip.

2. The combination according to claim 1 wherein the spindle further has a shoulder and the ring-like component is captured between the shoulder and the formed end.

3. The combination according to claim 1 wherein the formed end is turned outwardly against the ring-like component.

4. The combination according to claim 3 wherein the ring-like component has a irregular surface that is presented toward the curved inside corner, and wherein the circular clip is against the irregular surface.

5. The combination according to claim 3 wherein the spindle is provided with a spline; wherein the ring-like component has a spline which mates with the spline on the spindle; and wherein the circular clip is against the end of one of the splines.

6. The combination according to claim 5 wherein the spline on the ring-like component extends axially beyond the spline on the spindle so that its end is closer to the formed end than the end of the spline on the spindle; and wherein the circular clip is against the end of the spline on the ring-like component.

7. The combination according to claim 1 wherein the circular clip is circular in cross section.

8. The combination according to claim 1 wherein the circular clip is not continuous and when unrestrained has an inside diameter less than the outside diameter of the spindle at the inside corner in the spindle, whereby the clip snugly embraces the spindle.

9. A hub assembly for accommodating rotation about an axis, said hub assembly comprising: a hub located around the axis and having a spindle, a shoulder at one end of the spindle, and a formed end formed integral with and turned outwardly from the axis at the other end of the spindle; an antifriction bearing including an inner race located around the spindle and having a first back face that is presented toward the shoulder and a second back face that is presented toward the formed end, the bearing further including an outer race located around the inner race and rolling elements located between the inner and outer races; a ring located around the spindle between the second back face of the bearing and the formed end; and a clip located around the spindle and against the ring, the clip providing a radius along which the formed end turns outwardly away from the spindle.

10. A hub assembly according to claim 9 wherein the clip is circular in cross-section.

11. A hub assembly according to claim 9 wherein the inside diameter of the clip, when the clip is unrestrained; is less than the outside diameter of the spindle adjacent to the formed end, whereby the clip snugly embraces the spindle.

12. A hub assembly according to claim 9 wherein the ring, where it fits over the spindle, has an irregular surface, and the clip bears against the irregular surface.

13. A hub assembly according to claim 12 wherein the spindle has a spline where the ring fits around the spindle; wherein the ring has an interior spline which engages the spline on the spindle; and wherein the irregular surface on the ring is the end of the interior spline on the ring.

14. A hub assembly according to claim 13 wherein the ring has an end surface, and the formed end is against the end surface.

15. A hub assembly according to claim 14 wherein the hub has a flange that is formed integral with the spindle; and the shoulder lies along the flange.

16. A hub assembly according to claim 15 wherein the ring has an exterior spline which is presented outwardly away from the axis.

17. A hub assembly according to claim 13 wherein the ring has an end surface, and the formed end is against the end surface.

18. A hub assembly according to claim 17 wherein the ring has an exterior spline which is presented outwardly away from the axis.

19. A hub assembly for accommodating rotation about an axis, said hub assembly comprising: a hub located around the axis and having a spindle, a flange at one end of the spindle, and a formed end formed integral with the spindle at its other end and turned outwardly from the axis; an antifriction bearing including an inner race located around the spindle and having an end face that is presented toward the formed end, the bearing further including an outer race located around the inner race and rolling elements located between the inner and outer races; a ring located around the spindle between the end face on the inner race of the bearing and the formed end; and an annular element located around the spindle and against the ring, the annular element providing a curved surface along which the formed end turns outwardly away from the spindle.

20. A hub assembly according to claim 19 wherein the annular element is circular in cross-section.

21. A hub assembly according to claim 19 wherein the ring, where it fits over the spindle, has an irregular surface, and the annular element bears against the irregular surface.

22. A hub assembly according to claim 19 wherein the spindle has a spline where the ring fits around the spindle; wherein the ring has an interior spline which engages the spline on the spindle; and wherein the irregular surface on the ring is the end of the interior spline on the ring.

23. A hub assembly for accommodating rotation about an axis, said hub assembly comprising: a hub located around the axis and having a spindle, a flange at one end of the spindle, a formed end formed integral with the spindle at its other end turned outwardly from the axis at the other end of the spindle, and a spline located adjacent to the formed end and presented away from the axis; an antifriction bearing including an inner race located around the spindle and having an end face that is presented toward the formed end, the bearing further including an outer race located around the inner race and rolling elements located between the inner and outer races; a ring located around the spindle between the end face of the inner race for the bearing and the formed end and having an interior spline engaged with the spline on the spindle; and an annular element located around the spindle and against the end of at least one of the splines, and providing a curved surface along which the formed end turns outwardly away from the spindle.

24. A hub assembly according to claim 23 wherein the annular element is circular in cross-section.

25. A hub assembly according to claim 23 wherein the inside diameter of the annular element, when the annular element is unrestrained, is less than the outside diameter of the spindle adjacent to the formed end, whereby the annular element snugly embraces the spindle.

* * * * *